United States Patent [19]

Johnson et al.

[11] Patent Number: 5,022,628
[45] Date of Patent: Jun. 11, 1991

[54] MOUNTING FOR MACHINERY

[75] Inventors: Frederick A. Johnson, Sevenoaks; Malcolm A. Swinbanks, Cambridge, both of United Kingdom

[73] Assignee: GEC - Marconi Limited, Middlesex, United Kingdom

[21] Appl. No.: 376,550

[22] Filed: Jul. 7, 1989

[30] Foreign Application Priority Data

Jul. 7, 1988 [GB] United Kingdom ............... 8816188

[51] Int. Cl.⁵ .................... F16F 15/03; F16M 7/00; B63H 21/30
[52] U.S. Cl. ................................ 248/638; 114/269; 188/267; 248/550; 440/111
[58] Field of Search .............. 114/269; 248/550, 638; 188/267, 164; 440/111

[56] References Cited

U.S. PATENT DOCUMENTS

| | | | |
|---|---|---|---|
| 3,088,062 | 4/1963 | Hudimac | 248/550 |
| 3,911,829 | 10/1975 | Ross et al. | 308/10 |
| 3,941,402 | 3/1976 | Yankowski et al. | 308/10 |
| 3,952,979 | 4/1976 | Hansen | 248/550 |
| 4,244,629 | 1/1981 | Habermann | 308/10 |
| 4,351,515 | 9/1982 | Yoshida | 188/267 |
| 4,595,166 | 6/1986 | Kurokawa | 248/638 |
| 4,615,504 | 10/1986 | Sandercock | 248/550 |
| 4,624,435 | 11/1986 | Freudenberg | 248/550 |
| 4,650,170 | 3/1987 | Fukushima | 248/638 |
| 4,848,525 | 7/1989 | Jacot et al. | 248/550 |
| 4,869,474 | 9/1989 | Best et al. | 248/550 |

FOREIGN PATENT DOCUMENTS

| | | |
|---|---|---|
| 0027195 | 4/1981 | European Pat. Off. . |
| 0103188 | 3/1984 | European Pat. Off. . |
| 2804865 | 8/1978 | Fed. Rep. of Germany ...... 248/550 |
| 3024917 | 1/1981 | Fed. Rep. of Germany . |
| 2379732 | 9/1978 | France . |
| 1173658 | 12/1969 | United Kingdom . |
| 1601096 | 10/1981 | United Kingdom . |
| 2119897 | 11/1983 | United Kingdom . |

OTHER PUBLICATIONS

The Yarrow Constant Position Mounting Element, Shipbuilding & Marine International, Oct. 1973.
Some Recent Practical and Theoretical Developments in Noise Reduction in Ships. M. C. Hartnell-Beavis & M. A. Swinbanks, Institute of Marine Engineers, 21st Oct. 1976, Vibration and Noise Conference 1976.
Maglev at Birmingham Airport-from System Concept to Successful Operation. V. Nenadovic and E. E. Riches, GEC Review, vol. I, No. 1, 1985.
A Survey of Optimal Control of Distributed Parameter Systems. A. C. Robinson Office of Aerospace Research, USAF, ARL 69-0177, Nov. 1979, pp. 4 and 38-39.
R. J. Richards, An Introduction to Dynamics and Control, J. Wiley & Sons, 1979, pp. 339-343.
B. Chaplin, Anti-Noise-The Essex Breakthrough, CME, Jan. 1983, pp. 41-47.
The Handbook of Personal Computer Instrumentation, (3rd Edition), Burr-Brown Corp. and Intelligent Instrumentation, Inc., 1-88, pp. 6-3.

Primary Examiner—David H. Brown
Attorney, Agent, or Firm—Spencer & Frank

[57] ABSTRACT

The engine and other machinery within a marine vessel is mounted on a raft which is relatively flimsy compared with conventional constructions. The raft is supported by electromagnets, the current to which is controlled so as to avoid vibration and flexing which would otherwise take place and so as to reduce transmission of vibration to the hull and other parts of the ship.

7 Claims, 2 Drawing Sheets

MOUNTING FOR MACHINERY

BACKGROUND OF THE INVENTION

This invention relates to a mounting for machinery.

It is conventional in some areas of marine engineering to mount machines, including an engine, on a raft which is then installed in the hull of the ship with the interposition of springs and shock absorbers as a means of reducing the amount of noise transmitted through the hull.

Hitherto, the raft has been made as rigid as possible. This has resulted in a very large and heavy structure. Even so, however, problems are sometimes experienced as a result of vibration and flexing of the raft. This results in undesirable noise and can also result in breakdowns because of imperfect alignment of different articles of the machinery. One example of such problems has been the fracture of fuel pipes.

In U.K. patent application No. 2119897A, a means of damping or eleminating vibrations from a single point source is disclosed using a very simple active vibration control system.

The sensor detects a displacement due to vibration and controls a related actuator to oppose the vibration. Three such pairs of devices operating in the three mutually perpendicular axes will cancel the vibration in all directions. This is a basic idea of active vibration control but does not address the above problem.

The object of this invention is to solve the above problems.

BRIEF SUMMARY OF THE INVENTION

This invention provides a mounting for machinery inherently susceptible to flexing or resonance comprising an array of electromagnetic supports for the machinery and control means for controlling currents through the electromagnetic supports so as to suppress the effects of the flexing or resonance.

By employing the invention it will be appreciated that it becomes possible to use a raft construction which is relatively flimsy, or even to eliminate the raft completely, since the relative positioning of the different parts of the machinery, or the different machines, may be determined by the current through the electromagnets rather than by the stiffness of the raft. The size and weight of the conventional raft need therefore no longer be such a problem.

If the control means acts in such a way as to ensure that the integral force transmitted to the hull of the ship, or other carrier for the machinery, has a substantially zero component for vibrations associated with the aforementioned flexing and resonance, then noise and other vibration transmitted to the hull of the ship (or carrier for the machinery) can be very substantially reduced. This is an additional advantage that can be obtained by employing the invention.

Alternatively, the appropriately defined weighted integral of the force transmitted may have a substantially zero component for vibration associated with the flexing and resonance such that the force, although zero over the whole area of the raft, can be greater over localised areas that provide rigid support, this thereby eliminating or reducing forces on those areas of the hull that are weaker or themselves susceptible to vibration.

It is possible that hydraulic or other mechanisms could be used in place of the electromagnets and thus, in accordance with another aspect of the invention there is provided a mounting for machinery, which machinery is susceptible to flexing or resonance, comprising an array of adjustable supports for the machinery each adapted to apply a force to the machinery such that the sum of such forces supports the machinery, and control means for controlling the forces so applied whereby the effects of the flexing or resonance are suppressed.

BRIEF DESCRIPTION OF THE DRAWINGS

One way in which the invention may be performed will now be described by way of example with reference to the accompanying drawings in which.

DETAILED DESCRIPTION

Figure 1:
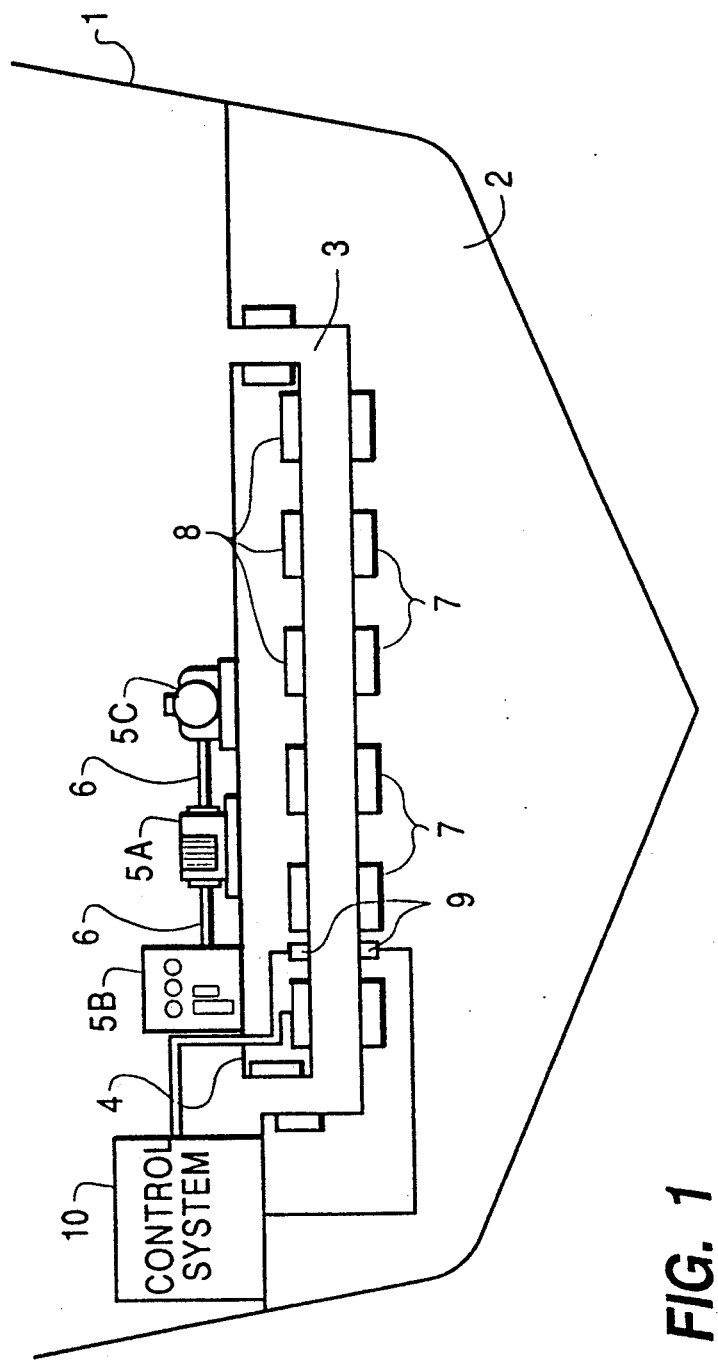
FIG. 1 is a schematic cross-section through a ship constructed in accordance with the invention.

Referring to FIG. 1 there is shown a ship having a hull 1 in which a seating 2 is installed in accordance with conventional practice. The seating defines a recess 3 which receives a raft 4 which, in the illustrated arrangement, is of relatively flimsy and flexible construction compared with known structures. The raft 4 carries various items of machinery including an engine 5a, a generator 5b and a pump 5c are linked together by links (shown schematically by the lines 6) and therefore need to be accurately aligned with each other.

A number of permanent magnets 7 are mounted in the seating 2 and these are aligned with respective electromagnets 8 mounted in the raft 4. Sensing transducers 9, only two pairs of which are shown, are also mounted on the seating and on the raft and act to detect the distance between those two components at different places. Sensing transducers may be comprised of any transducer type giving an electrical output, but preferably comprise either optical or magnetic sensing means.

An electronic control system 10 receives measurements from the sensors and controls the currents through the various electromagnets in such a way as to ensure that (a) the raft 4 does not flex or vibrate and (b) the integral force transmitted to the seating from the raft has a substantially zero component for vibrations associated with any flexing and resonance of the machinery itself.

Although in this embodiment electromagnets 8 are described as repelling permanent magnets 7, one skilled in the art will realise that pairs of electromagnets may be used; or, alternatively, an arrangement is foreseen whereby electromagnets are used to attract metallic members connected to either the raft or the hull in order to keep the raft levitated.

Figure 2:
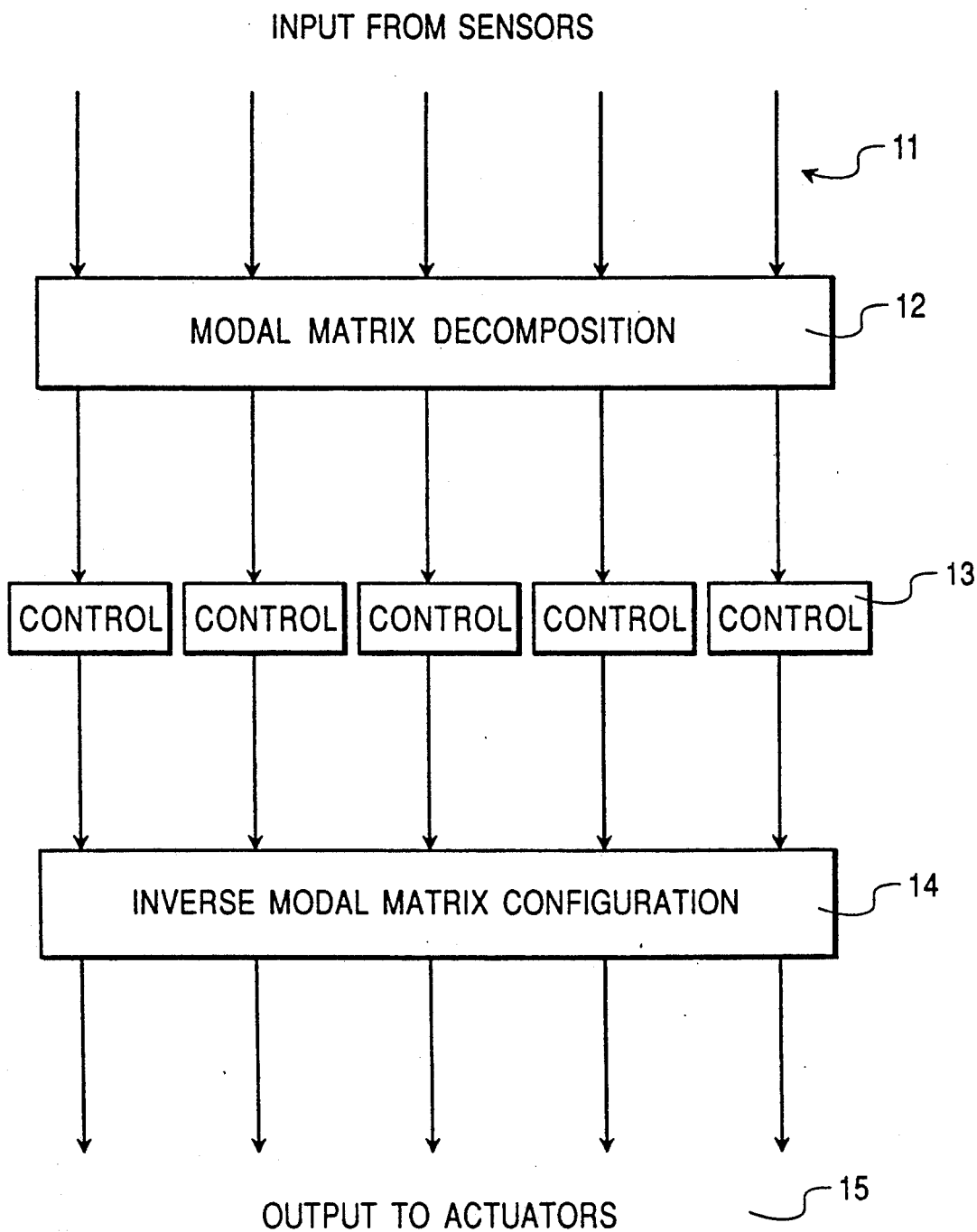
FIG. 2 is a schematic illustration of the functioning of the control.

With reference to FIG. 2 a schematic illustration is shown of the functioning of the control device. The output of the sensors 11 undergoes a model matrix decomposition function which identifies wave functions within the raft. Once these wave functions are identified control elements for each magnetic actuator produce an inverse modal matrix configuration 14 which via the output to the actuators 15 reduces or cancels flexing and vibrations within the raft.

We claim:

1. A mounting for machinery, comprising:

a flexible raft for mounting items of machinery;

electromagnetic means, including an array of electromagnets disposed for supporting, in operation, said raft and the items of machinery mounted on said raft;

sensing means, including an array of sensing elements, arranged for sensing dynamic properties of said raft at different places on said raft; and control means connected to said electromagnetic means and to said sensing means controlling said array of electromagnets in dependence of signals received from said sensing means so that the electromagnets in said array of electromagnets support said raft for maintaining the items of machinery mounted on said raft in a substantially fixed positional relationship to one another.

2. A mounting as claimed in claim 1, wherein said sensing means includes further sensing elements for detecting lateral movement of said raft and producing output signals corresponding to the lateral movement, and said electromagnetic means includes further electromagnets arranged so that, in operation, they produce a lateral force on said raft in dependence of the output signals from said further sensing elements.

3. A mounting as claimed in claim 1, wherein said electromagnetic means produces supporting forces between said raft and a substantially rigid structure for supporting said raft relative to the structure.

4. A mounting as claimed in claim 1 forming a combination with a ship having a rigid hull, wherein said electromagnetic means produces supporting forces between said raft and said hull for supporting said raft relative to said hull.

5. A combination as claimed in claim 4, wherein said sensing means includes further sensing elements for detecting lateral movement of said raft and producing output signals corresponding to the lateral movement, and said electromagnetic means includes further electromagnets arranged so that, in operation, they produce a lateral force on said raft in dependence of the output signals from said further sensing elements.

6. A mounting as claimed in claim 1 forming a combination with a ship having a rigid hull and a rigid seating fixed to said hull, wherein said electromagnetic means produces supporting forces between said raft and said seating for supporting said raft relative to said seating.

7. A combination as claimed in claim 6, wherein said sensing means includes further sensing elements for detecting lateral movement of said raft and producing output signals corresponding to the lateral movement, and said electromagnetic means includes further electromagnets arranged so that, in operation, they produce a lateral force on said raft in dependence of the output signals from said further sensing elements.

* * * * *